United States Patent
Toi et al.

(10) Patent No.: US 9,963,787 B2
(45) Date of Patent: May 8, 2018

(54) PAINT PRETREATMENT AGENT FOR COATING-TYPE PAINT, AND COATING-TYPE PAINTING METHOD

(71) Applicant: Chemetall GmbH, Frankfurt am Main (DE)

(72) Inventors: Teruzo Toi, Tokyo (JP); Minoru Inoue, Osaka (JP)

(73) Assignee: Chemetall GmbH, Frankfurt (DE)

( * ) Notice: Subject to any disclaimer, the term of this patent is extended or adjusted under 35 U.S.C. 154(b) by 312 days.

(21) Appl. No.: 14/351,302

(22) PCT Filed: Oct. 12, 2012

(86) PCT No.: PCT/JP2012/076492
§ 371 (c)(1),
(2) Date: Apr. 24, 2014

(87) PCT Pub. No.: WO2013/054905
PCT Pub. Date: Apr. 18, 2013

(65) Prior Publication Data
US 2015/0176136 A1    Jun. 25, 2015

(30) Foreign Application Priority Data
Oct. 14, 2011 (JP) .................. 2011-227215

(51) Int. Cl.
| | |
|---|---|
| C23C 22/34 | (2006.01) |
| C09D 5/08 | (2006.01) |
| C23C 22/73 | (2006.01) |
| C23C 22/82 | (2006.01) |
| C09D 5/00 | (2006.01) |
| B05D 7/14 | (2006.01) |
| B05D 7/00 | (2006.01) |

(52) U.S. Cl.
CPC .............. *C23C 22/34* (2013.01); *C09D 5/002* (2013.01); *C09D 5/08* (2013.01); *C23C 22/73* (2013.01); *C23C 22/82* (2013.01); *B05D 7/14* (2013.01); *B05D 7/51* (2013.01); *C23C 2222/20* (2013.01)

(58) Field of Classification Search
CPC ......... C23C 22/34; C23C 22/73; C23C 22/82; C23C 2222/20; C09D 5/08; B05D 7/14
See application file for complete search history.

(56) References Cited

U.S. PATENT DOCUMENTS

| | | | |
|---|---|---|---|
| 7,811,366 B2 | 10/2010 | Inbe et al. | |
| 8,430,972 B2 | 4/2013 | Inbe et al. | |
| 8,436,093 B2 | 5/2013 | Inbe et al. | |
| 2004/0144451 A1* | 7/2004 | Matsukawa | C23C 22/34 148/247 |
| 2010/0176000 A1* | 7/2010 | Inbe | C08G 73/0246 205/50 |

FOREIGN PATENT DOCUMENTS

| | | |
|---|---|---|
| EP | 1433876 A1 | 6/2004 |
| JP | 2004-218070 A | 8/2004 |
| JP | 2004-218074 A | 8/2004 |
| JP | 2004-218075 A | 8/2004 |
| JP | 2007-262577 A | 10/2007 |
| JP | 201167737 A | 4/2011 |
| JP | 201168930 A | 4/2011 |

* cited by examiner

Primary Examiner — Lois Zheng
(74) Attorney, Agent, or Firm — Armstrong Teasdale LLP

(57) ABSTRACT

The pretreatment agent for use before forming a coat by paint application of the present invention contains (A) one or more metal elements selected from a group consisting of zirconium, titanium and hafnium, (B) fluorine, (C) one or more coupling agents selected from an amino group-containing silane coupling agent, its hydrolyzate, and its polymer, and (D) a component of at least one of an allylamine and a polyallylamine, in which the ratio by mass of the coupling agent (C) to the component (D), (C/D) is 1 or more. The coating method by paint application of the present invention includes a chemical conversion treatment step of chemically treating a metal substrate with the pretreatment agent, and a step of forming a coat by paint application on the chemically-treated metal substrate. When a coating film is formed through forming a coat by paint application on the surface of a metal substrate that has been pretreated according to the present invention, the coating film can have excellent adhesion, salt water resistance and impact resistance.

15 Claims, No Drawings

US 9,963,787 B2

PAINT PRETREATMENT AGENT FOR COATING-TYPE PAINT, AND COATING-TYPE PAINTING METHOD

This application is a § 371 of International Application No. PCT/JP2012/076492 filed Oct. 12, 2012, and claims priority from Japanese Patent Application No. 2011-227215 filed Oct. 14, 2011.

TECHNICAL FIELD

The present invention relates to a pretreatment agent for use before forming a coat by paint application and to a coating method by paint application that uses the agent.

BACKGROUND ART

In case where the surface of a metal substrate is subjected to electrodeposition coating or a coating by paint application, for example, aqueous coating, solvent coating, powder coating or the like, the surface of the metal substrate is, before forming a coat, chemically treated to form a chemical conversion film for the purpose of improving the performance, such as corrosion resistance, adhesion to a coating film and the like.

Heretofore, as the chemical conversion treatment agent for the chemical conversion treatment, widely used are a chromate-type chemical conversion treatment agent and a zinc phosphate-type chemical conversion treatment agent. However, as containing chromium, the chromate-type chemical conversion treatment agent involves a risk of environmental load; and as containing a phosphate ion, the zinc phosphate-type chemical conversion treatment agent involves a risk of river and ocean nourishment.

Consequently, a chemical conversion treatment agent containing at least one of zirconium, titanium and hafnium has become specifically noted as a chemical conversion treatment agent substitute for those chromate-type chemical conversion treatment agent and zinc phosphate-type chemical conversion treatment agent.

For example, PTL 1 describes a chemical conversion treatment agent that comprises at least one selected from a group consisting of zirconium, titanium and hafnium, fluorine, and an amino group-containing silane coupling agent.

PTL 2 describes a chemical conversion treatment agent comprising at least one selected from a group consisting of zirconium, titanium and hafnium, fluorine, and a water-soluble resin, wherein the water-soluble resin is a polyvinylamine resin and/or a polyallylamine.

PTL 3 describes a chemical conversion treatment agent comprising at least one selected from a group consisting of zirconium, titanium and hafnium, fluorine, an adhesion imparting agent, and a chemical conversion reaction accelerator, wherein the adhesion imparting agent is at least one of a specific metal ion (A), an alkaline earth metal ion (B), a Periodic Table Group 3 metal ion (C), a copper ion (D), a silicon-containing compound (E), a water-soluble resin such as a polyallylamine resin or the like (F), an amino group-containing water-soluble epoxy resin (G), and a silane coupling agent or the like (H). As the silane coupling agent, there is mentioned an amino group-containing amino silane coupling agent.

The role of coating is mainly for esthetic purposes and protection. Depending on the intended use of products and parts, a suitable coating system is employed. For example, for products that require high-level corrosion resistance such as automobile bodies, electrodeposition coating is employed for corrosion-resistant primer coating. Electrodeposition coating is generally employed for so-called corrosion-resistant primer coating of which the main function is for corrosion resistance and adhesion enhancement. A design of a coating film excellent in adhesion and corrosive substance-blocking capability, typically with an epoxy resin or the like, is made.

On the other hand, a coating by paint application is employed for many products, for which a wide variety of coating materials are used. However, some coating materials are inferior to corrosion-resistant primers of typically electrodeposition paint in point of adhesion and corrosive factor-blocking capability. Specifically, an epoxy resin is rarely used as a top-coating paint from the viewpoint of weather resistance, and therefore the adhesion is often not good. To some products, a film thickness of more than 30 μm may be given, which, however, would bring about a problem of coating film stripping owing to stress.

CITATION LIST

Patent Literature

PTL 1: JP-A 2004-218070
PTL 2: Japanese Patent 4276530
PTL 3: JP-A 2004-218075

SUMMARY OF INVENTION

Technical Problem

In PTL 1 to 3, any sufficient investigations are not made relating to a chemical conversion treatment agent for use before forming a coat by paint application that makes it possible to form a coating film by paint application excellent in adhesion, salt water resistance and impact resistance, on the surface of a chemical conversion film.

Specifically, in PTL 1, various types of substrates are, after having been chemically treated, processed for solvent coating (Examples 36 to 40), aqueous coating (Examples 41 to 45) or powder coating (46 to 50), as shown in Table 3 therein. However, in all these Examples 36 to 50, the same chemical conversion treatment agent is used, and therefore in these, any sufficient investigations are not made as to what type of chemical conversion treatment agent would be suitable for use before forming a coat by paint application.

In PTL 2 and 3, there are given only examples of electrodeposition coating on the surface of a chemical conversion film formed through chemical conversion treatment; or that is, no examples are given therein relating to coating by paint application on the surface of the chemical conversion film, for example, by aqueous coating, solvent coating or powder coating. Accordingly, in PTL 2 and 3, any sufficient investigations are not made relating to a chemical conversion treatment agent for coating by paint application that makes it possible to form a coating film by paint application excellent in adhesion, salt water resistance and impact resistance, on the surface of a chemical conversion film.

In addition, in PTL 1 to 3, any sufficient investigations are not made relating to the relationship between the content ratio of the amino group-containing silane coupling agent to the (poly)allylamine and the paint performance.

Specifically, PTL 1 has a description relating to incorporation of an amino group-containing silane-coupling agent in a chemical conversion treatment agent, but nothing is described therein relating to additional incorporation of a (poly)allylamine in the agent.

Contrary to this, PTL 2 describes incorporation of a (poly)allylamine in a chemical conversion treatment agent, but does not describe additional incorporation of an amino group-containing silane coupling agent therein.

PTL 3 uses an adhesion imparting agent as the indispensable component of the chemical conversion treatment agent therein, but says that incorporation of at least one of the above-mentioned components (A) to (H) is enough for the adhesion imparting agent (Claim 1 in PTL 1), or that is, the polyallylamine resin (F) and the aminosilane coupling agent (H) each are not the indispensable component of the chemical conversion treatment agent. Therefore, in PTL 3, nothing is referred to that relates to the influence of the ratio by mass of the aminosilane coupling agent (H) to the polyallylamine resin (F) (H/F) in the chemical conversion treatment agent on various capabilities (adhesion, saltwater resistance, impact resistance, etc.) of coating.

The present invention has been made in consideration of the above, and its object is to provide a pretreatment agent for use before forming a coat by paint application which, when a coating film having a thickness of at least 30 μm is formed through coating by paint application on the surface of a metal substrate that has been processed for pretreatment (chemical conversion treatment) with the agent, is able to make the coating film have excellent adhesion, salt water resistance and impact resistance, and to provide a coating method by paint application which is able to form a coating film excellent in adhesion, salt water resistance and impact resistance.

Solution to Problem

The present inventors have assiduously studied for the purpose of attaining the above-mentioned object and, as a result, have found that a pretreatment agent for use before forming a coat by paint application, which contains a metal element of zirconium or the like, fluorine, a predetermined coupling agent and a (poly)allylamine and in which the content ratio of the coupling agent to the (poly)allylamine is defined to fall within a predetermined range, can attain the object.

The present invention has been completed on the basis of the findings.

Specifically, the present invention provides the following [1] to [9].

[1] A pretreatment agent containing (A) one or more metal elements selected from a group consisting of zirconium, titanium and hafnium, (B) fluorine, (C) one or more coupling agents selected from an amino group-containing silane coupling agent, its hydrolyzate, and a polymer of the amino group-silane coupling agent, and (D) a component of an allylamine and/or a polyallylamine, wherein the ratio by mass of the coupling agent (C) to the component (D), (C/D) is 1 or more.

[2] The pretreatment agent according to the above-mentioned [1], wherein the content of the metal element (A) is from 30 to 200 ppm by mass, the content of the coupling agent (C) is from 100 to 300 ppm by mass, and the content of the component (D) is from 50 to 200 ppm by mass.

[3] The pretreatment agent according to the above-mentioned [1] to [2], further containing (E) one or more metal elements selected from a group consisting of aluminium, zinc, magnesium and barium.

[4] The pretreatment agent according to the above-mentioned [1] to [2], wherein the ratio by mass of the total mass of the coupling agent (C) and the component (D) to the mass of the metal element (A), ((C+D)/A) is from 0.5 to 8.

[5] The pretreatment agent according to any of the above-mentioned [1] to [4], not containing an amino group-containing epoxy compound.

[6] A coating method by paint application including a chemical conversion treatment step of chemically treating a metal substrate with the pretreatment agent of any of the above-mentioned [1] to [5], and a step of forming a coat by paint application on the chemically-treated metal substrate.

[7] The coating method by paint application according to [6], wherein the coating method by paint application is aqueous coating or powder coating.

[8] The coating method by paint application according to claim [6] or [7], wherein the metal substrate is an iron-based substrate.

[9] The coating method by paint application according to any of [6] to [8], wherein the thickness of the coating film is at least 30 μm.

Advantageous Effects of Invention

According to the present invention, there are provided a pretreatment agent for use before forming a coat by paint application which, when a coating film is formed through coating by paint application on the surface of a chemically-treated metal substrate, is able to make the coating film have excellent adhesion, salt water resistance and impact resistance, and a coating method by paint application which is able to form a coating film excellent in adhesion, salt water resistance and impact resistance.

DESCRIPTION OF EMBODIMENTS

Next, the present invention is described in detail with reference to the embodiments thereof.

In the present invention, "coating by paint application" typically indicates aqueous coating, solvent coating, powder coating or the like and means brush coating, roller coating, dipping, spraying or the like, but does not include electrodeposition coating. "paint for paint application" means a paint material for use in coating by paint application.

In the present invention, the metal element (A) may be referred to as the component (A); fluorine (B) may be referred to as the component (B); the coupling agent (C) may be referred to as the component (C); the component (D) of allylamine and/or polyallylamine may be referred to as the component (D).

Pretreatment Agent for Use Before Forming a Coat by Paint Application

The pretreatment agent for use before forming a coat by paint application of the present invention contains (A) one or more metal elements selected from a group consisting of zirconium, titanium and hafnium, (B) fluorine, (C) one or more coupling agents selected from an amino group-containing silane coupling agent, a hydrolyzate thereof, and a polymerized product thereof, and (D) a component of an allylamine and/or a polyallylamine, wherein the ratio by mass of the coupling agent (C) to the component (D), (C/D) is 1 or more.

In the present invention, "component (D) of an allylamine and/or a polyallylamine" means "component (D) of at least one selected from a group consisting of an allylamine and a polyallylamine".

When the surface of a metal substrate is subjected to chemical conversion treatment with the pretreatment agent for use before forming a coat by paint application mentioned above and when the chemically-treated surface is painted in a mode of coating by paint application, then the coating film formed according to the coating by paint application can have excellent adhesion, salt water resistance and impact resistance.

In particular, the pretreatment agent is favorable as a pretreatment agent for forming a thick coating film having a thickness of at least 30 μm. Specifically, when the coating film to be formed on the chemically-treated surface of a substrate according to a coating by paint application is a thick film, then the coating film may be given stress to cause coating film stripping and, as a result, the adhesion thereof would lower. However, in the pretreatment agent for use before forming a coat by paint application of the present invention, the component (D) of allyamine and/or polyallylamine is considered to impart flexibility to the chemical conversion film and, as a result, the adhesion, the impact resistance and the esthetic appearance of top coat could be thereby bettered. From these viewpoints, the pretreatment agent is favorable as a pretreatment for forming a thick coating film having a thickness of at least 35 μm, more preferably at least 40 μm, even more preferably at least 45 μm, still more preferably at least 50 μm.

<Metal Element (A)>

The pretreatment agent for use before forming a coat by paint application of the present invention contains one or more elements (A) selected from a group consisting of zirconium, titanium and hafnium. These metal elements (A) are chemical conversion film-forming components, and when a chemical conversion film containing the metal element (A) is formed on a metal substrate, then the corrosion resistance and the abrasion resistance of the metal substrate are thereby enhanced and, further, the adhesion to the coating film to be formed on the chemical conversion film can also be enhanced. Preferably, the metal element (A) contains zirconium, and is more preferably zirconium.

Not specifically defined, the zirconium source includes soluble fluorozirconates, for example, alkali metal fluorozirconates such as $K_2ZrF_6$, etc.; fluorozirconates such as $(NH_4)_2ZrF_6$, etc.; soluble fluorozirconic acids, for example, fluorozirconic acids such as $H_2ZrF_6$, etc.; zirconium fluoride; zirconium oxide, etc.

Not specifically defined, the titanium source includes soluble fluorotitanates, for example, alkali metal fluorotitanates, fluorotitanates such as $(NH_4)_2TiF_6$, etc.; fluorotitanic acids such as $H_2TiF_6$, etc.; titanium fluoride; titanium oxide, etc.

Not specifically defined, the hafnium source includes, for example, fluorohafnic acids such as HHfF, etc.; hafnium fluoride, etc.

The source of the metal element (A) is preferably a compound having one or more selected from a group consisting of $ZrF_6^{2-}$, $TiF_6^{2-}$ and $HfF_6^{2-}$, as the film formability thereof is high.

The content of the metal element (A) in the pretreatment agent for use before forming a coat by paint application is preferably within a range of from 30 to 200 ppm by mass in terms of the metal-equivalent content thereof relative to the total amount of the pretreatment agent. When the content is at least the lower limit, then the above-mentioned capabilities (corrosion resistance, abrasion resistance and adhesion to coating film of the metal substrate) would be sufficient; and when at most the upper limit, then the chemical conversion film could be given flexibility and the adhesion of the coating film to be formed on the chemical conversion film would be thereby bettered. The content of the metal element (A) is more preferably from 35 to 165 ppm by mass, even more preferably from 40 to 120 ppm by mass, still more preferably from 45 to 110 ppm by mass.

<Fluorine (B)>

Fluorine (B) to be contained in the pretreatment agent for use before forming a coat by paint application plays a role of an etching agent for metal substrate. Not specifically defined, the source of fluorine (B) includes, for example, a fluorine-containing compound of the metal element (A) and a fluorine compound. Specific examples of the fluorine-containing compound of the metal element (A) includes soluble fluorozirconates, for example, alkali metal fluorozirconates such as $K_2ZrF_6$, etc.; fluorozirconates such as $(NH_4)_2ZrF_6$, etc.; fluorozirconic acids such as $H_2ZrF_6$, etc.; zirconium fluoride; soluble fluorotitanates, for example, alkali metal fluorotitanates, fluorotitanates such as $(NH_4)_2TiF_6$, etc.; fluorotitanic acids such as $H_2TiF_6$, etc.; titanium fluoride; hafnium compounds, for example, fluorohafnic acids such as HHfF, etc.; hafnium fluoride, etc. Specific examples of the fluorine compound include fluorides such as hydrofluoric acid, ammonium fluoride, fluoroboric acid, ammonium hydrogenfluoride, sodium fluoride, sodium hydrogenfluoride, etc. As complex fluorides, for example, there are mentioned hexafluorosilicates, and as their examples, there are mentioned hydrofluosilicic acid, zinc hydrofluosilicate, manganese hydrofluosilicate, magnesium hydrofluosilicate, nickel hydrofluosilicate, iron hydrofluosilicate, calcium hydrofluosilicate, etc.

In case where the source of the metal element (A) contains fluorine, any additional fluorine source would be unnecessary since fluorine could be supplied by the source of the metal element (A).

The content of fluorine (B) in the pretreatment agent is preferably within a range of from 30 to 800 ppm by mass. When the content of fluorine (B) is not lower than the above-mentioned lower limit, then the metal substrate could be fully etched; and when not higher than the higher limit, then metal substrate could be prevented from being over-etched. The content of fluorine (B) is more preferably from 50 to 300 ppm by mass, even more preferably from 50 to 200 ppm by mass, still more preferably from 50 to 100 ppm by mass.

<Coupling Agent (C)>

The coupling agent (C) to be contained in the pretreatment agent for use before forming a coat by paint application mentioned above is one or more selected from an amino group-containing silane coupling agent, its hydrolyzate, and a polymer of the amino group-silane coupling agent.

The amino group-containing silane coupling agent is a compound having at least one amino group in the molecule and having a siloxane bond. At least one selected from a group consisting of the above-mentioned amino group-containing silane coupling agent, its hydrolyzate, and a polymer of the amino group-silane coupling agent acts both on the chemical conversion film and the coating film to thereby enhance the adhesion between the two and better the blistering preventing effect of the coating film.

These effects could result from the phenomena that the group capable of forming silanol through hydrolysis would be hydrolyzed to adsorb to the surface of a metal substrate in a mode of hydrogen bonding therebetween and that the adhesion between the chemical conversion film and the metal substrate could be enhanced owing to the action of the amino group. As described above, at least one selected from a group consisting of the amino group-containing silane coupling agent, its hydrolyzate, and its polymer would act on both the metal substrate and the coating film to thereby enhance the adhesion between the two.

Not specifically defined, the amino group-containing silane coupling agent may be any known silane coupling agent including, for example, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N,N-bis[3-(trimethoxysilyl)propyl]ethylenediamine, etc. Commercially-available amino group-containing silane coupling agents, KBM-602, KBM-603, KBE-603, KBM-903, KBE-9103, KBM-573 (all manufactured by Shin-etsu Chemical Industry Co., Ltd.), XS1003 (manufactured by Chisso Co., Ltd.) and others are also usable here.

A hydrolyzate of the above-mentioned amino group-containing silane coupling agent may be prepared according to a conventional known method, for example, according to a method of dissolving the amino group-containing silane coupling agent in ion-exchanged water followed by controlling the resulting solution to be acidic with any acid, or the like. As the hydrolyzate of the amino group-containing silane coupling agent, usable here are commercial products such as KBP-90 (manufactured by Shin-etsu chemical Industry Co., Ltd., active ingredient 32%), etc.

A polymer of the above-mentioned amino group-containing silane coupling agent may be prepared according to a conventional known method, for example, according to a method of reacting two or more different types of those amino group-containing silane coupling agents in an aqueous solution, etc.

The content of the coupling agent (C) in the pretreatment agent is preferably within a range of from 100 to 300 ppm by mass as the solid concentration thereof. In other words, the solid content of the silane coupling agent (C) in the total amount of the pretreatment agent is preferably within a range of from 100 to 300 ppm by mass. When the content is not lower than the lower limit, then the coating film adhesion and the blistering preventing effect would be excellent. When not higher than the higher limit, the amount of the coupling agent to be used could be economically reduced, and the formation of the chemical conversion film with the metal element (A) could be prevented from being retarded and therefore the corrosion resistance of the metal substrate could be thereby enhanced. The content of the coupling agent (C) is more preferably from 150 to 250 ppm by mass.

<Component (D)>

The pretreatment agent for use before forming a coat by paint application mentioned above must contain the component (D) of an allylamine and/or a polyallylamine. Preferably, the component is a polyallylamine.

The pretreatment agent containing the component (D) is excellent in the adhesion and the impact resistance of the coating film. The reason would be because the component (D) could have a function of adsorbing to the metal substrate and to the coating film to thereby enhance the adhesion of the coating film and a function of imparting flexibility to the chemical conversion film to thereby enhance the adhesion and the impact resistance of the coating film. The component (D) is basic and is therefore effective for enhancing the adhesion to an anionic water-based coating material generally dispersed with an anionic resin.

The polyallylamine resin is not specifically defined. For example, usable here are commercially-available polyallylamine resins such as PAA-01, PAA-03, PAA-05, PAA-08, PAA-15, PAA-15C, PAA-25, PAA-HCL-01, PAA-HCL-03, PAA-HCL-05, PAA-HCL-3L, PAA-HCL-10L, PAA-SA, PAA-D11-HCL, PAA-D41-HCL, PAA-D19-HCL, PAA-D19A, PAA-1112CL, PAA-1112, PAA-U5000, PAA-AC5050A (all manufactured by Nittobo Co., Ltd.), etc.

The content of the component (D) in the pretreatment agent is preferably within a range of from 50 to 200 ppm by mass as the solid concentration thereof. In other words, the solid content of the component (D) in the total amount of the pretreatment agent is preferably within a range of from 5 to 200 ppm by mass. When the content is not lower than the lower limit, then the adhesion and the impact resistance of the coating film would be excellent. When not higher than the higher limit, the amount of the component (D) to be used could be economically reduced and any excessive amount thereof could not be taken in the chemical conversion film, thereby bringing about good coating film adhesion. The content of the component (D) is more preferably from 100 to 150 ppm by mass.

<Metal Element (E)>

The pretreatment agent may contain one or more metal elements (E) selected from a group consisting of iron, zinc, aluminium, magnesium, barium, copper, manganese, tin and strontium. The metal element (E), if any, in the agent enhances the corrosion resistance and/or the coatability of the substrate with the coating film. In particular, when containing barium and aluminium, the pretreatment agent could enhance the corrosion resistance.

Not specifically defined, the source of the metal element includes, for example, nitrates, sulfates, chlorides, acetates and the like of the metal element (E). Especially preferred are nitrates.

The content of the metal element (E) in the pretreatment agent is preferably from 10 to 500 ppm by mass. When the content is not lower than the lower limit, then the above-mentioned capabilities could be sufficient; and when not higher than the higher limit, then the amount of the metal element (E) to be used could be economically reduced, and a suitable amount of the element could be taken in the coating film. The content of the metal element (E) is more preferably from 20 to 300 ppm by mass, even more preferably from 30 to 150 ppm by mass.

<Ratio by Mass (C/D)>

The ratio by mass of the component (D) to the coupling agent (C), (C/D) in the pretreatment agent is 1 or more. When the ratio by mass (C/D) is less than 1, then the adhesion and the salt water resistance of the coating film to be formed on the chemical conversion film would be poor. Preferably, the ratio by mass (C/D) is at most 4.5. When the ratio is at most 4.5, the amount of the coupling agent (C) is not relatively too large and the adhesion to the coating film and the impact resistance would be excellent. Preferably, the ratio by mass (C/D) is from more than 1 to 4.5

<Ratio by Mass ((C+D)/A)>

In the pretreatment agent, the ratio by mass of the total of the coupling agent (C) and the component (D) to the metal element (A), ((C+D)/A) is preferably from 0.5 to 8.0. When the ratio by mass ((C+D)/A) is not lower than the lower limit, then the flexibility of the chemical conversion film could be excellent and the adhesion and the impact resistance of the coating film could be good. When the ratio by mass ((C+D)/A) is not higher than the higher limit, then the amount of the metal element (A) in the chemical conversion film could be large and the corrosion resistance of the film could be good. The ratio by mass ((C+D)/A) is more preferably from 1.0 to 7.8, even more preferably from 2.0 to 7.5, still more preferably from 3.0 to 7.3.

<pH of Pretreatment Agent>

Preferably, the pH of the pretreatment agent for use before forming a coat by paint application of the present invention is within a range of from 1.5 to 6.5. When the pH is not lower than the lower limit, then overetching could be prevented and a good chemical conversion film can be formed. When not higher than the higher limit, then etching would be sufficient and a good film can be formed. More preferably, the pH is from 2 to 5.5, even more preferably from 2.5 to 5. As the pH regulator for pH adjustment, usable here are acid compounds such as nitric acid, sulfuric acid, etc.; basic compounds such as sodium hydroxide, potassium hydroxide, ammonia, etc.

Content of Components (A) to (D) and Content of Components (A) to (E)

In case where the pretreatment agent does not contain the component (E), the content of the components (A) to (D) in the components of the pretreatment agent, from which the solvent and the pH regulator have been removed, is preferably at least 60% by mass, more preferably at least 80% by mass, even more preferably at least 90% by mass, still more preferably at least 95% by mass, further more preferably 99% by mass, still further more preferably 100% by mass, from the viewpoint of improving the corrosion resistance, the adhesion and the appearance of the coating film.

In case where the pretreatment agent contains the component (E), the content of the components (A) to (E) in the components of the pretreatment agent, from which the solvent and the pH regulator have been removed, is preferably at least 60% by mass, more preferably at least 80% by mass, even more preferably at least 90% by mass, still more preferably at least 95% by mass, further more preferably 99% by mass, still further more preferably 100% by mass, from the same viewpoint as above.

Production Method for Pretreatment Agent

The pretreatment agent of the present invention may be produced by adding the source of the metal element (A), the source of fluorine (B), the coupling agent (C), the component (D) and optionally the source of the metal element (E) and other components in water such as industrial water or the like followed by mixing them.

In the case, the components may be added to and mixed with water all at a time, or may be sequentially added one by one thereto or multiple components may be added thereto sequentially, and then mixed. In case where the components are sequentially added to and mixed in water, the sequence of the addition is not specifically defined.

Coating Method

The coating method by paint application of the present invention includes a chemical conversion treatment step of chemically treating a metal substrate with the pretreatment agent for use before forming a coat by paint application mentioned above, and a step of forming a coating film by paint application on the chemically-treated metal substrate.

<Metal Substrate>

As the metal substrate, there may be mentioned a zinc-based substrate, an iron-based substrate, an aluminium-based substrate, etc. The zinc-based, iron-based and aluminium-based substrates as referred to herein mean a zinc-based substrate of which the substrate is formed of zinc and/or its alloy, an iron-based substrate of which the substrate is formed of iron and/or its alloy, and an aluminium-based substrate of which the substrate is formed of aluminium and/or its alloy. The coating method by paint application of the present invention is applicable also to multiple metal substrates of those zinc-based substrate, iron-based substrate and aluminium-based substrate.

Not specifically defined, the zinc-based substrate includes, for example, zinc or zinc-based alloy-plated steel sheets and the like of, for example, zinc-based electroplated, hot-dipped or evaporation-plated steel sheets and the like, such as zinc plated steel sheets, zinc-nickel plated steel sheets, zinc-iron plated steel sheets, zinc-chromium plated steel sheets, zinc-aluminium plated steel sheets, zinc-titanium plated steel sheets, zinc-magnesium plated steel sheets, zinc-manganese plated steel sheets, etc. Not specifically defined, the iron-based substrate includes, for example, cold-rolled steel sheets, hot-rolled steel sheets, etc. Not specifically defined, the aluminium-based substrate includes, for example, 5000 series aluminium alloys, 6000 series aluminium alloys, etc.

The metal substrate in the coating method by paint application of the present invention can be favorably applicable even to an iron-based substrate, for which pretreatment with chemical conversion treatment agent of zirconium or the like has heretofore been unsuitable, in that sufficient coating film adhesion can be given to the substrate; and accordingly, the present invention is especially excellent as applicable even to chemical conversion treatment of a material to be coated that contains at least partly an iron-based substrate.

<Chemical Conversion Treatment Step>

This step is for chemical conversion treatment of a metal substrate, using the above-mentioned pretreatment agent for use before forming a coat by paint application. The chemical conversion treatment condition is not specifically defined except that the pretreatment agent for use before forming a coat by paint application of the present invention is used as the treatment agent, and therefore any ordinary chemical conversion treatment condition is employable here.

The chemical conversion treatment temperature is preferably from 20 to 70° C., more preferably from 30 to 50° C. The chemical conversion treatment time is preferably from 5 to 1200 seconds, more preferably from 30 to 120 seconds. Not specifically defined, the chemical conversion treatment method includes, for example, a dipping method, a spraying method, a roll coating method, etc.

Before the chemical conversion treatment step, preferably, the metal substrate is treated in a step of degreasing followed by washing with water after degreasing.

The degreasing step is for removing oil and dirt adhering to the surface of the metal substrate, in which the metal substrate is immersed in a degreasing agent such as a phosphorus-free nitrogen-free degreasing washing liquid or the like generally at 30 to 55° C. for a few minutes. If desired, before the degreasing treatment, the metal substrate may be additionally processed for predegreasing treatment. The washing step with water after degreasing is for washing away the degreasing agent after the degreasing treatment, for example, by spraying once or more with a large amount of washing water.

After the chemical conversion treatment step, preferably, the metal substrate is processed in a step of washing with water after chemical conversion treatment.

The step of washing with water after chemical conversion treatment is for washing once or more the chemically-treated substrate with water for the purpose of removing any negative influence on the adhesion, corrosion resistance and the like after various coating treatments. In this case, it is suitable that the final washing is attained with pure water. For the step of washing with water after chemical conversion treatment, for example, employable is any of spraying with or immersing in water, or the two may be combined.

The pretreatment step in the coating method by paint application of the present invention uses the above-mentioned pretreatment agent, and therefore does not require any surface control treatment that is required in the case where a zinc phosphate-type chemical conversion treatment agent is used. Therefore in the present invention, the metal substrate may be chemically treated according to the method that comprises a smaller number of steps.

After the treatment of washing with water after chemical conversion treatment, the drying step may be omitted. Even though the drying step is omitted and the substrate still having a wet chemical conversion film is processed in the next step of coating by paint application, the wet condition of the chemical conversion film would not have any significant influence on the properties of the coating film to be formed thereon. In the drying step, if any, the substrate is preferably dried with cold air or hot air. In hot air drying, preferably, the temperature is not higher than 300° C. for preventing the organic matter from decomposing.

<Step of Forming a Coat by Paint Application>

In this step, the metal substrate after the chemical conversion treatment step may be subjected to a coating by paint application. For the coating by paint application, any known coating method except electrodeposition coating is employable, which includes, for example, spray coating, electrostatic spray coating, rotary atomization electrostatic coating, powder coating, dip coating, roll coater coating, roller coating, brush coating, etc.

In this step, the substrate may be painted repeatedly to have multiple coating layers formed thereon.

The thickness of the coating film to be formed in this step is not specifically defined.

However, when the coating film is thick, then in general, the film would be readily influenced by stress and would be troubled by coating film stripping. However, using the above-mentioned pretreatment agent makes the chemical conversion film have excellent flexibility and the influence of stress on the film could be thereby relaxed and, as a result, the adhesion between the chemical conversion film and the metal substrate and the adhesion between the chemical conversion film and the coating film and also the impact resistance of the coated substrate could be thereby enhanced and the coating film stripping could be prevented. Accordingly, for example, when the dry film thickness is from 30 to 120 μm, then the effect of the coupling agent (C) and the component (D) is high, and the effect is higher when the thickness is from 50 to 120 μm.

The paint material for use in the step is not specifically defined. As the paint material, for example, there are mentioned a solvent-based paint material, a water-based paint material and powdery paint material.

Concretely, the solvent-based paint material includes a solvent-based acrylic resin paint material, a solvent-based polyester resin paint material, a solvent-based urethane resin paint material, a solvent-based alkyd resin paint material, etc. As the curing agent for those paint materials, there are mentioned a melamine resin, an isocyanate resin, a blocked isocyanate resin, a carbodiimide resin, etc.

The water-based paint material is substantially the same as the solvent-based paint material, concretely except that the solvent in the latter paint material is changed to water in the former, and as the water-based paint material, there may be mentioned a thermosetting water-based paint material that contains a resin and a curing agent dispersed or dissolved in water, etc.

The powdery paint material concretely includes an acryl resin-based powdery paint material, an epoxy-polyester resin-based powdery paint material, a polyester resin-based powdery paint material, an epoxy resin-based powdery paint material, etc.

Especially in a case where a paint material containing, as a curing agent therein, a melamine resin or the like that releases a large amount of a removed matter in curing is used in this step, the coating film may be given stress and may be troubled by coating film stripping; however, in the coating method by paint application of the present invention, the above-mentioned pretreatment agent is used in the chemical conversion treatment method, and therefore the chemical conversion film formed could have excellent flexibility and the adhesion and the impact resistance of the coating film could be bettered to prevent the coating film stripping.

On the other hand, the paint material for use in this step generally contains a plasticizer component such as a silicone additive or the like since the coating film to be formed is required to be flat and smooth. The plasticizer component exists in the interface between the chemical conversion film and the coating film, and therefore the adhesion between the chemical conversion film and the coating film would be thereby lowered to often cause coating film stripping. The pretreatment agent of the present invention contains the component (D) having a high basicity, and therefore owing to the acid-base interaction between the component and the anionic resin or the carboxylic acid resin in the paint material, the adhesion would increase and the coating film stripping could be thereby prevented.

EXAMPLE

The invention is described in more detail with reference to the following Examples. Not specifically indicated in these Examples, "part" is "part by mass", and "%" is "% by mass".

Example 1

<Metal Substrate>

A commercially-available cold-rolled steel sheet (SPCC-SD, manufactured by Nippon Test Panel Co., Ltd., 70 mm×150 mm×0.8 mm) was used as the metal substrate, and processed for pretreatment before forming a coat by paint application under the condition mentioned below.

<Pretreatments Before Forming a Coat by Paint Application>

(1) Degreasing Treatment

The substrate was immersed in 2 mass % "SURF-CLEANER EC92" (a degreasing agent manufactured by Nippon Paint Co., Ltd.) at 40° C. for 2 minutes.

(2) Washing Treatment with Water after Degreasing

The degreased substrate was sprayed with tap water for 30 seconds.

(3) Chemical Conversion Treatment

Into 10 L of industrial water, added was hydrofluozirconic acid ($H_2ZrF_6$) as the source for the chemical conversion film-forming component, metal element (A) and fluorine (B); further added was acidic ammonium fluoride (manufactured by Morita Chemical Industry Co., Ltd.) as the source for fluorine (B); added was KBM-603 (N-β(aminoethyl)γ-aminopropyltrimethoxysilane, manufactured by Shin-etsu Chemical Industry Co., Ltd.) as the coupling agent (C); and used was PAA-15C (polyallylamine resin having a weight-average molecular weight of 15000, manufactured by Nittobo Co., Ltd.) as the component (D), thereby preparing a pretreatment agent for use before forming a coat by paint application having the composition shown in Table 1.

Using nitric acid or sodium hydroxide, the pH of the agent was adjusted to be 4.0. Thus prepared, the pretreatment agent was controlled to have a temperature of 40° C., and the metal substrate was immersed therein for 90 seconds. The concentration of the coupling agent (C) and the component (D) is expressed in terms of the solid-equivalent concentration thereof.

(4) Washing Treatment with Water after Chemical Conversion Treatment

The chemically-treated substrate was sprayed with tap water for 30 seconds. Further, this was sprayed with ion-exchanged water for 30 seconds.

(5) Drying Treatment

After washed with water, the substrate was dried for water removal at 40° C. for 3 minutes, and subjected to the next coating step.

<Coating>

As a water-based paint material A, a thermosetting water-based polyester paint material "product name: O-de Eco130 Z975" (manufactured by Nippon Paint Co., Ltd.) was sprayed onto the substrate to form thereon a coating film that could have a predetermined dry thickness, and then baked and cured at 160° C. for 20 minutes. The found data of the thickness of the coating film are shown in Table 1.

<Evaluation Test>

(1) Primary Adhesion Test

The test piece was left under the condition at 23° C. and a humidity of 50% for 24 hours or more, and then the adhesion of the coating film was evaluated in a 1 mm×1 mm cross-cut test according to JIS D0202 4.15. The samples were evaluated on the basis of the following criteria.

Point 5: No stripping occurred (best).
Point 4: No cross-cut stripping occurred, but linear peeling along cross-cuts partly occurred.
Point 3: No cross-cut stripping occurred, but linear peeling along all cross-cuts occurred.
Point 2: From 1 to 5 cross-cuts stripped.
Point 1: From 6 to 100 cross-cuts stripped.

The evaluation results are shown in Table 1.

(2) Salt Water Dipping Test (SDT)

The obtained test plate was given two longitudinal parallel cuts (length X mm, distance between two cuts Y mm) that reached the substrate, and then dipped in an aqueous 5% NaCl solution at 50° C. for 840 hours. Subsequently, the cuts were stripped with an adhesive tape, and the area of the stripped film ($Z$ mm$^2$) was measured. Next, the areal ratio of the stripped film ($Z$ mm$^2$) to the area between the two longitudinal parallel cuts (X×Y mm$^2$), (Z/(X×Y)×100%) was calculated, and the paint strippability was evaluated according to the following criteria.

Point 5: The area ratio was 5% or less.
Point 4: The area ratio was from more than 5% to 20%.
Point 3: The area ratio was from more than 20% to 30%.
Point 2: The area ratio was from more than 30% to 40%.
Point 1: The area ratio was more than 40%.

The evaluation results are shown in Table 1.

(3) Impact Resistance Test

According to JIS K5600-5-3 and using an impact deformation tester (product name "DuPont Impact Tester", manufactured by Toyo Seiki Co., Ltd.) on the back side of the coated face of the sample, a weight having a size of 0.5 inches and a mass of 0.5 kg was dropped down from a height of 30 cm, and the coating film was visually checked for the stripping state thereof according to the judgment criteria mentioned below.

Judgment Criteria

Point 5: No stripping occurred (best).
Point 4: No stripping occurred, but ring-like cracks formed.
Point 3: The coating film around the impact area swelled.
Point 2: The coating film around the impact area stripped.
Point 1: The coating film on the entire surface of the impact area stripped (worst).

The evaluation results are shown in Table 1.

Examples 2 to 17, Comparative Examples 1 to 5, and Reference Examples 1 to 3

The same process as in Example 1 was carried out except that pretreatment agents each having the composition shown in Table 1 were prepared. The results are shown in Table 1.

Aluminium, zinc, magnesium and barium as the metal element (E) were added as aluminium nitrate, zinc nitrate, magnesium nitrate and barium nitrate, respectively.

The abbreviations in Table 1 mean as follows.
KBE-903: γ-aminopropyltriethoxysilane (manufactured by Shin-etsu Chemical Industry Co., Ltd.)
KBM-903: γ-aminopropyltrimethoxysilane (manufactured by Shin-etsu Chemical Industry Co., Ltd.)
PAA-25C: polyallylamine resin (weight-average molecular weight 25000, manufactured by Nittobo Co., Ltd.)
Water-based Paint Material A: a thermosetting water-based polyester paint material "product name: O-de Eco130 Z975" manufactured by Nippon Paint Co., Ltd.
Water-based Paint Material B: a polyester resin water-based paint material "product name: O-de Eco130 Z637" manufactured by Nippon Paint Co., Ltd.
Water-based Paint Material C: a polyester resin water-based paint material "product name: O-de Eco130 Z13" manufactured by Nippon Paint Co., Ltd.
Powdery Paint Material D: a polyester resin powdery paint material "product name: Biryushia PCM-1500" manufactured by Nippon Paint Co., Ltd.

TABLE 1

| | Composition of Pretreatment Agent | | | | | | | | | | | |
|---|---|---|---|---|---|---|---|---|---|---|---|---|
| | | | | | | | (C + D)/A ratio by mass | C/D ratio by mass | E/ppm | | | |
| | A/ppm | B/ppm | C/ppm | | D/ppm | | | | Al | Zn | Mg | Ba |
| Example 1 | 50 | 62.5 | KBM603 | 200 | PAA-15C | 150 | 7.0 | 1.3 | — | — | — | — |
| Example 2 | 100 | 125 | KBE903 | 100 | PAA-15C | 50 | 1.5 | 2.0 | — | — | — | — |
| Example 3 | 100 | 125 | KBE903 | 200 | PAA-15C | 50 | 2.5 | 4.0 | — | — | — | — |

TABLE 1-continued

| | | | | | | | | | | | | |
|---|---|---|---|---|---|---|---|---|---|---|---|---|
| Example 4 | 100 | 125 | KBE903 | 300 | PAA-15C | 200 | 5.0 | 1.5 | — | — | — | — |
| Example 5 | 200 | 250 | KBM603 | 100 | PAA-15C | 50 | 0.8 | 2.0 | — | — | — | — |
| Example 6 | 200 | 313 | KBM603 | 250 | PAA-15C | 200 | 2.3 | 1.3 | 30 | — | — | — |
| Example 7 | 200 | 250 | KBM603 | 250 | PAA-15C | 200 | 2.3 | 1.3 | — | 500 | — | — |
| Example 8 | 200 | 250 | KBM603 | 250 | PAA-15C | 200 | 2.3 | 1.3 | — | — | 500 | — |
| Example 9 | 200 | 250 | KBM603 | 250 | PAA-15C | 200 | 2.3 | 1.3 | — | — | — | 300 |
| Example 10 | 200 | 250 | KBM603 | 250 | PAA-15C | 200 | 2.3 | 1.3 | — | — | — | — |
| Example 11 | 100 | 125 | KBM603 | 250 | PAA-15C | 200 | 4.5 | 1.3 | — | 250 | 250 | — |
| Example 12 | 100 | 230 | KBM903 | 250 | PAA-15C | 200 | 4.5 | 1.3 | 50 | 200 | 200 | — |
| Example 13 | 200 | 250 | KBM603 | 250 | PAA-25C | 200 | 2.3 | 1.3 | — | — | — | — |
| Example 14 | 200 | 250 | KBM603 | 250 | PAA-25C | 200 | 2.3 | 1.3 | — | — | — | — |
| Example 15 | 200 | 250 | KBM603 | 250 | PAA-25C | 200 | 2.3 | 1.3 | — | — | — | — |
| Example 16 | 100 | 125 | KBE903 | 200 | PAA-15C | 50 | 2.5 | 4.0 | — | — | — | — |
| Example 17 | 100 | 125 | KBE903 | 200 | PAA-15C | 50 | 2.5 | 4.0 | — | — | 500 | — |
| Comparative Example 1 | 200 | 250 | KBE903 | 200 | — | — | — | — | — | — | — | — |
| Comparative Example 2 | 200 | 250 | — | — | PAA-15C | 200 | 1.0 | — | — | — | — | — |
| Comparative Example 3 | 500 | 625 | KBE903 | 100 | PAA-15C | 150 | 0.3 | 0.7 | — | — | — | — |
| Comparative Example 4 | 100 | 125 | KBE903 | 20 | PAA-15C | 300 | 3.0 | 0.1 | — | — | — | — |
| Comparative Example 5 | 100 | 125 | KBE903 | 5 | PAA-15C | 800 | 8.0 | 0.01 | — | — | — | — |
| Reference Example 1 | | | | | zinc phosphate | | | | | | | |
| Reference Example 2 | | | | | zinc phosphate | | | | | | | |
| Reference Example 3 | | | | | zinc phosphate | | | | | | | |

| | Properties of Coating Film | | | |
|---|---|---|---|---|
| | Paint Material | Thickness of Coating film μm | Adhesion | Salt Water Resistance | Impact Resistance |
| Example 1 | A | 58 | 5 | 5 | 5 |
| Example 2 | A | 53 | 5 | 5 | 5 |
| Example 3 | A | 54 | 5 | 5 | 5 |
| Example 4 | A | 50 | 5 | 5 | 5 |
| Example 5 | A | 49 | 4 | 4 | 4 |
| Example 6 | A | 56 | 4 | 5 | 4 |
| Example 7 | A | 60 | 4 | 5 | 4 |
| Example 8 | A | 58 | 4 | 4 | 4 |
| Example 9 | A | 55 | 4 | 4 | 4 |
| Example 10 | A | 50 | 4 | 4 | 4 |
| Example 11 | A | 61 | 5 | 5 | 4 |
| Example 12 | A | 59 | 5 | 4 | 4 |
| Example 13 | A | 32 | 4 | 4 | 4 |
| Example 14 | B | 31 | 4 | 4 | 4 |
| Example 15 | C | 33 | 4 | 4 | 4 |
| Example 16 | D | 50 | 5 | 5 | 5 |
| Example 17 | D | 49 | 5 | 4 | 5 |
| Comparative Example 1 | A | 48 | 3 | 3 | — |
| Comparative Example 2 | A | 46 | 3 | 1 | — |
| Comparative Example 3 | A | 48 | 3 | 3 | — |
| Comparative Example 4 | A | 47 | 3 | 1 | — |
| Comparative Example 5 | A | 53 | 3 | 1 | — |
| Reference Example 1 | A | 51 | 4 | 4 | 4 |
| Reference Example 2 | B | 51 | 4 | 4 | 4 |
| Reference Example 3 | C | 51 | 4 | 4 | 4 |

As shown in Table 1, Examples 1 to 17 were excellent in all of primary adhesion, salt water resistance and impact resistance.

As opposed to these, Comparative Example 1 not containing the component (D) and Comparative Example 2 not containing the coupling agent (C) were not good in point of primary adhesion and salt water resistance.

In addition, Comparative Examples 3 to 5 in which C/D was smaller than the range (1 or more) in the present invention were also not good in point of primary adhesion and salt water resistance.

The invention claimed is:

1. A pretreatment agent for use before forming a coat by paint application, the pretreatment agent comprising:
(A) one or more metal elements selected from the group consisting of zirconium, titanium and hafnium,
(B) fluorine,
(C) one or more coupling agents selected from the group consisting of an amino group-containing silane coupling agent, a hydrolyzate of the amino group-containing silane coupling agent, and a polymer of the amino group-silane coupling agent, and
(D) a component of an allylamine and/or a polyallylamine,
wherein the ratio by mass of the one or more coupling agents (C) to the component (D), (C/D) is from 1.3 to 4, and wherein the ratio by mass of the total mass of the one or more coupling agents (C) and the component (D) to the mass of the one or more metal elements (A), ((C+D)/A) is from 0.8 to 7.0.

2. The pretreatment agent according to claim 1, wherein the content of the one or more metal elements (A) is from 30 to 200 ppm by mass, the content of the one or more coupling agents (C) is from 100 to 300 ppm by mass as the solid concentration thereof, and the content of the component (D) is from 50 to 200 ppm by mass as the solid concentration thereof.

3. The pretreatment agent according to claim 1, further comprising (E) one or more metal elements selected from the group consisting of aluminum, zinc, magnesium and barium.

4. The pretreatment agent according to claim 2, further comprising (E) one or more metal elements selected from the group consisting of aluminum, zinc, magnesium and barium.

5. The pretreatment agent according to claim 2, wherein the pretreatment agent does not contain an amino group-containing epoxy compound.

6. The pretreatment agent according to claim 3, wherein the pretreatment agent does not contain an amino group-containing epoxy compound.

7. The pretreatment agent according to claim 4, wherein the pretreatment agent does not contain an amino group-containing epoxy compound.

8. The pretreatment agent according to claim 1, wherein the pretreatment agent does not contain an amino group-containing epoxy compound.

9. A coating method by paint application comprising a chemical conversion treatment step of chemically treating a metal substrate with the pretreatment agent of claim 8, and a step of forming a coat by paint application on the chemically-treated metal substrate.

10. The coating method according to claim 9, wherein the coating method by paint application is an aqueous coating or a powder coating.

11. The coating method according to claim 9, wherein the metal substrate is an iron-based substrate.

12. The coating method according to claim 10, wherein the metal substrate is an iron-based substrate.

13. The coating method according to claim 9, wherein the coat has a thickness of at least 30 μm.

14. The coating method by paint application according to claim 10, wherein the coat has a thickness of at least 30 μm.

15. The coating method by paint application according to claim 11, wherein the coat has a thickness of at least 30 μm.

* * * * *